No. 665,844. Patented Jan. 8, 1901.
F. W. WEEKS.
MACHINE FOR MANUFACTURING CARBON COATED PAPER.
(Application filed Feb. 1, 1900.)
(No Model.) 10 Sheets—Sheet 3.
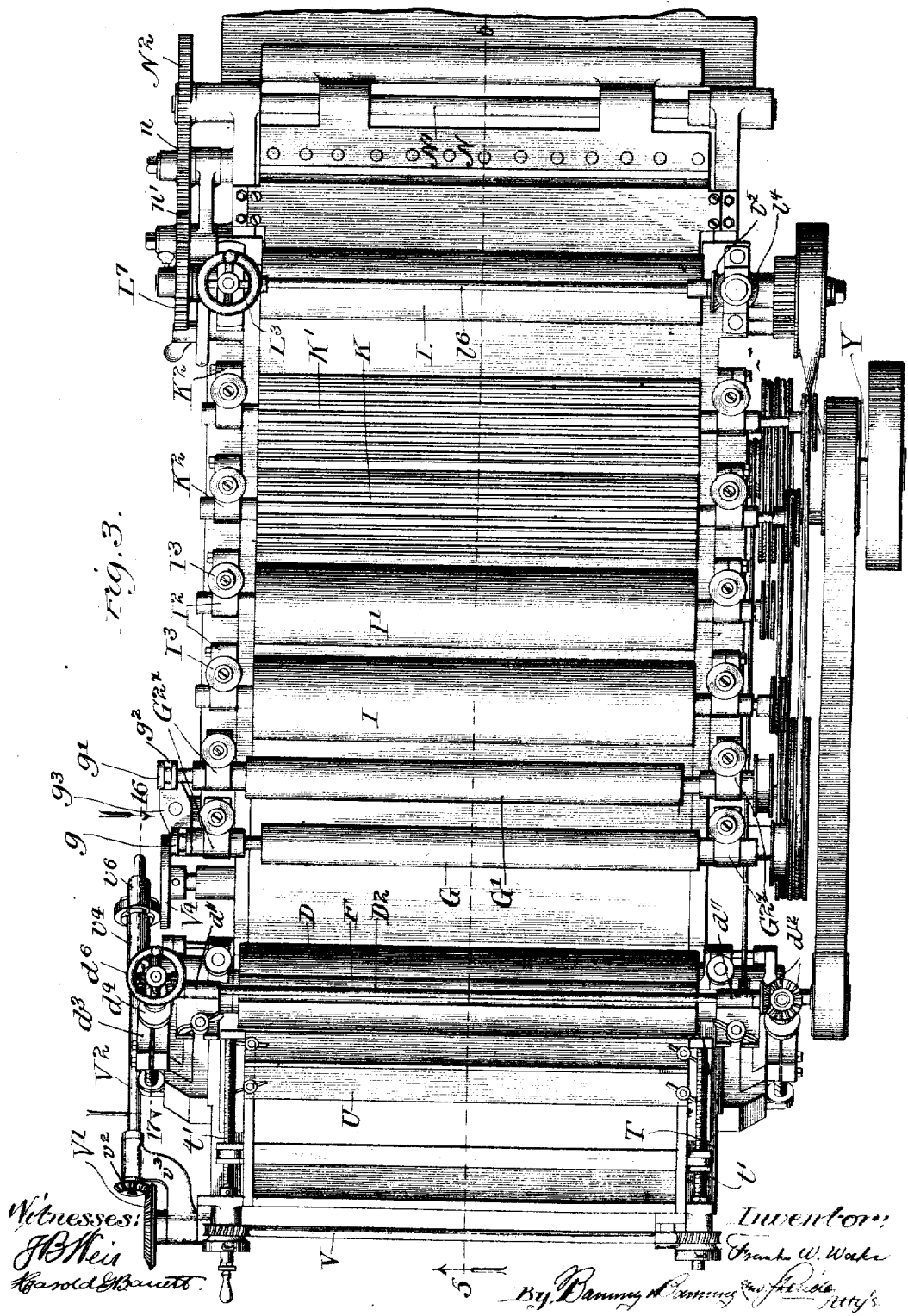

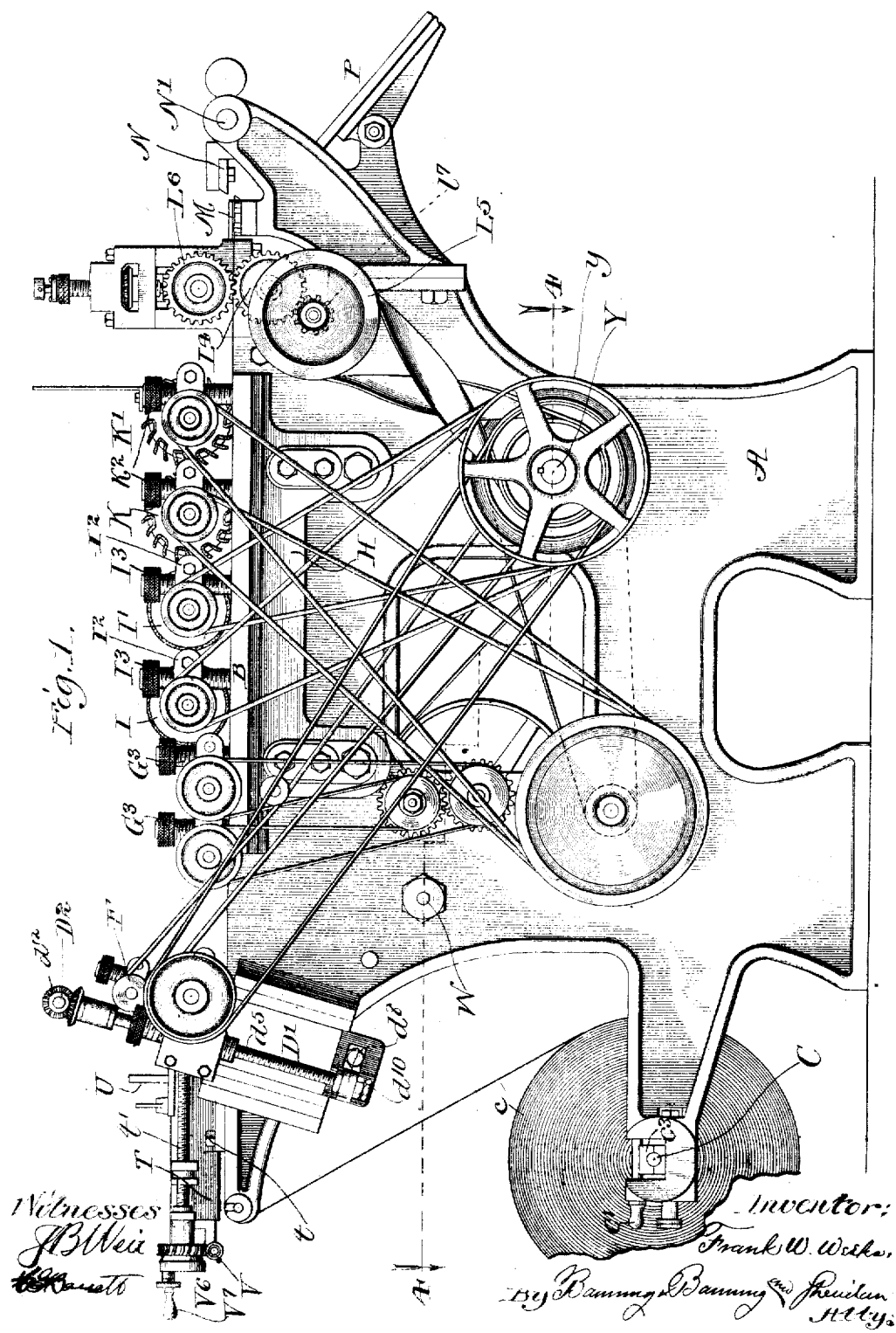

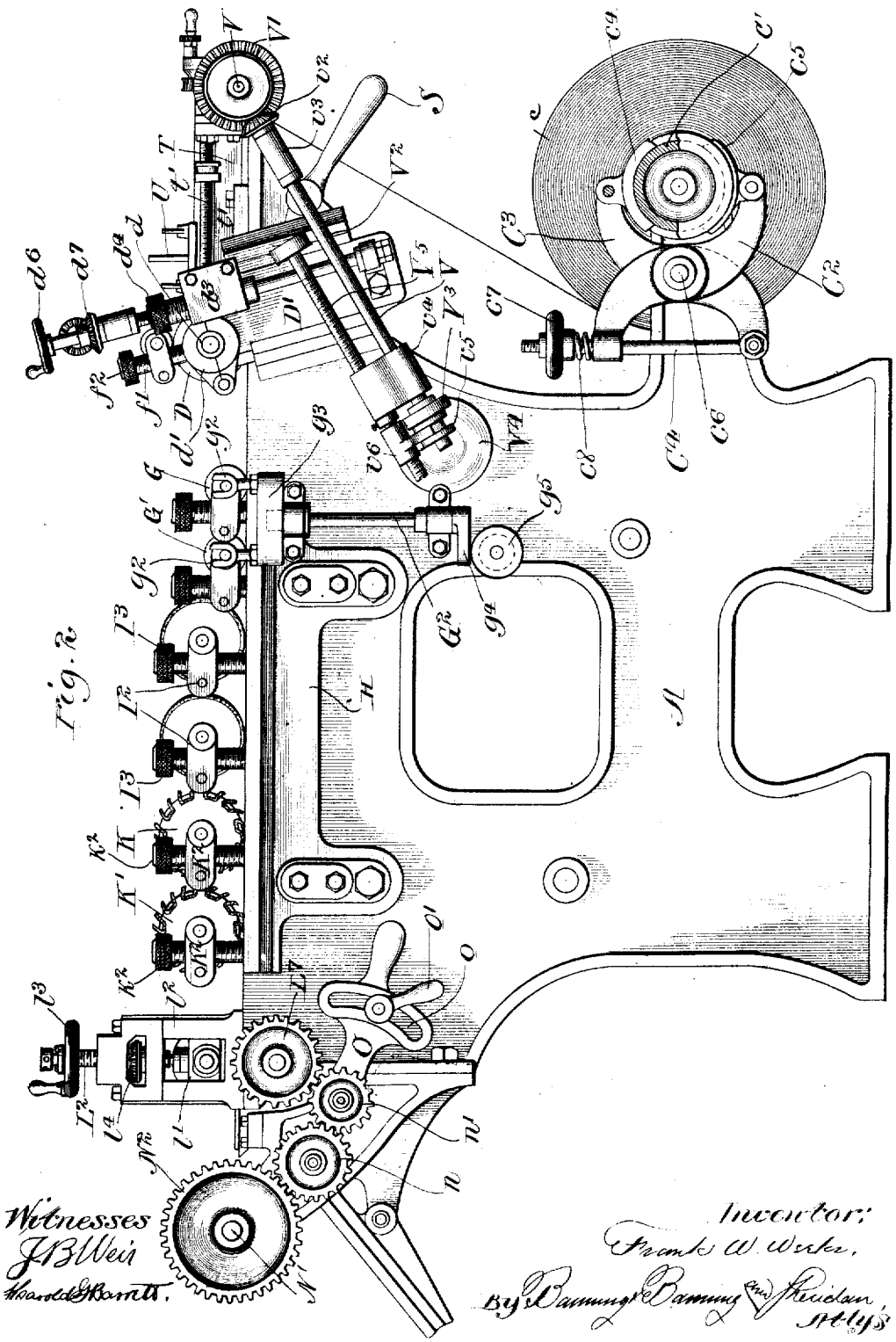

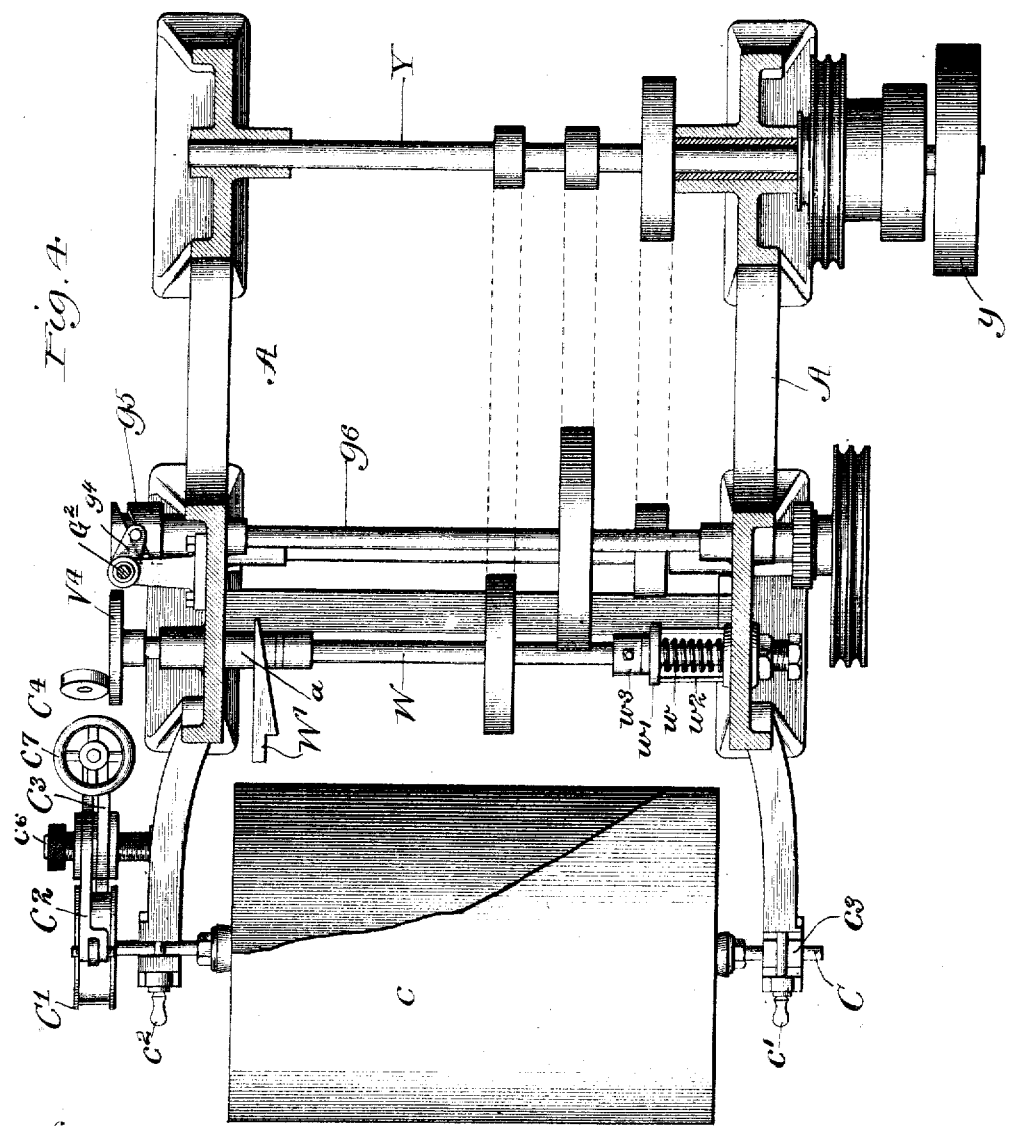

No. 665,844. Patented Jan. 8, 1901.
F. W. WEEKS.
MACHINE FOR MANUFACTURING CARBON COATED PAPER.
(Application filed Feb. 1, 1900.)
(No Model.) 10 Sheets—Sheet 5.
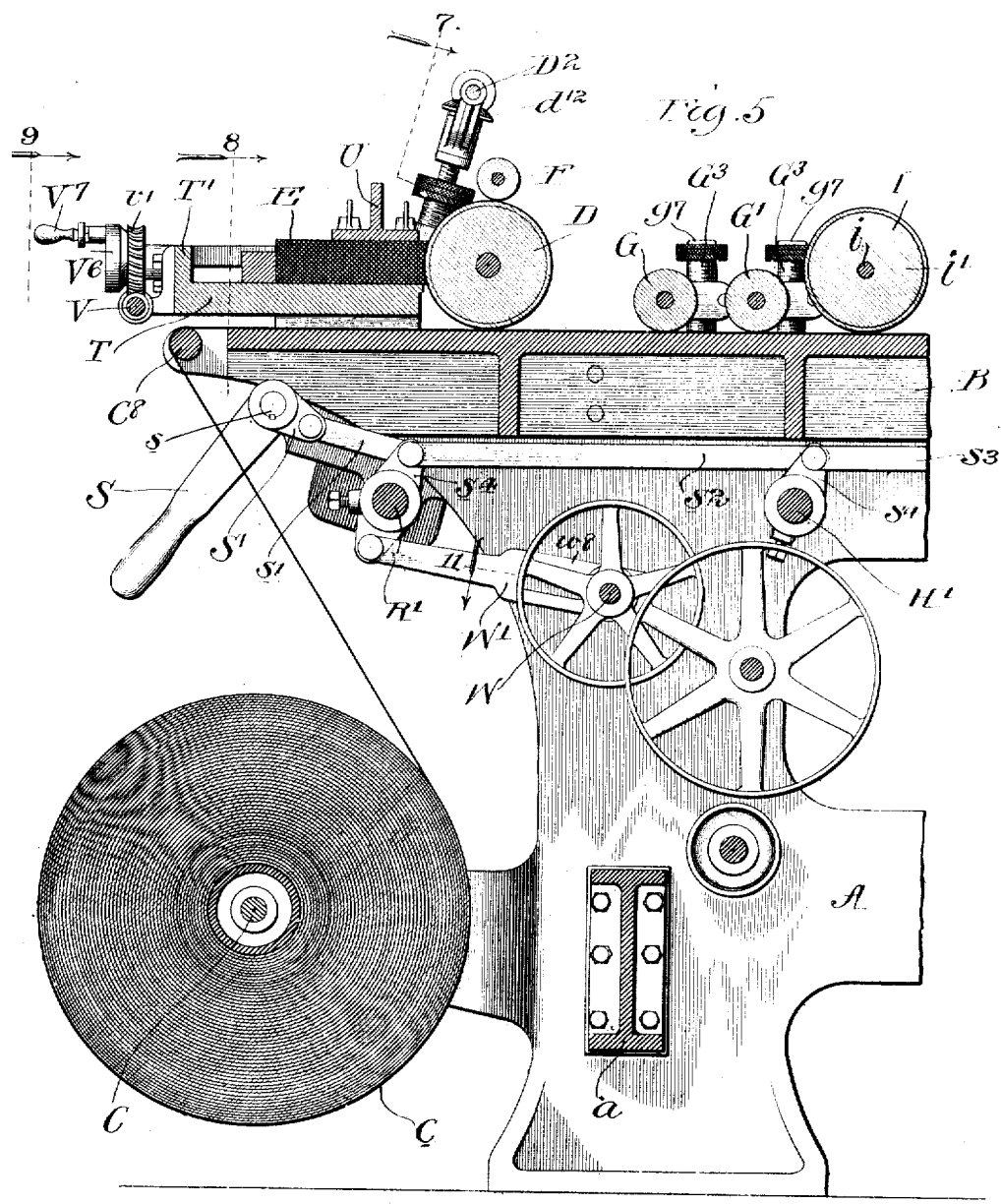

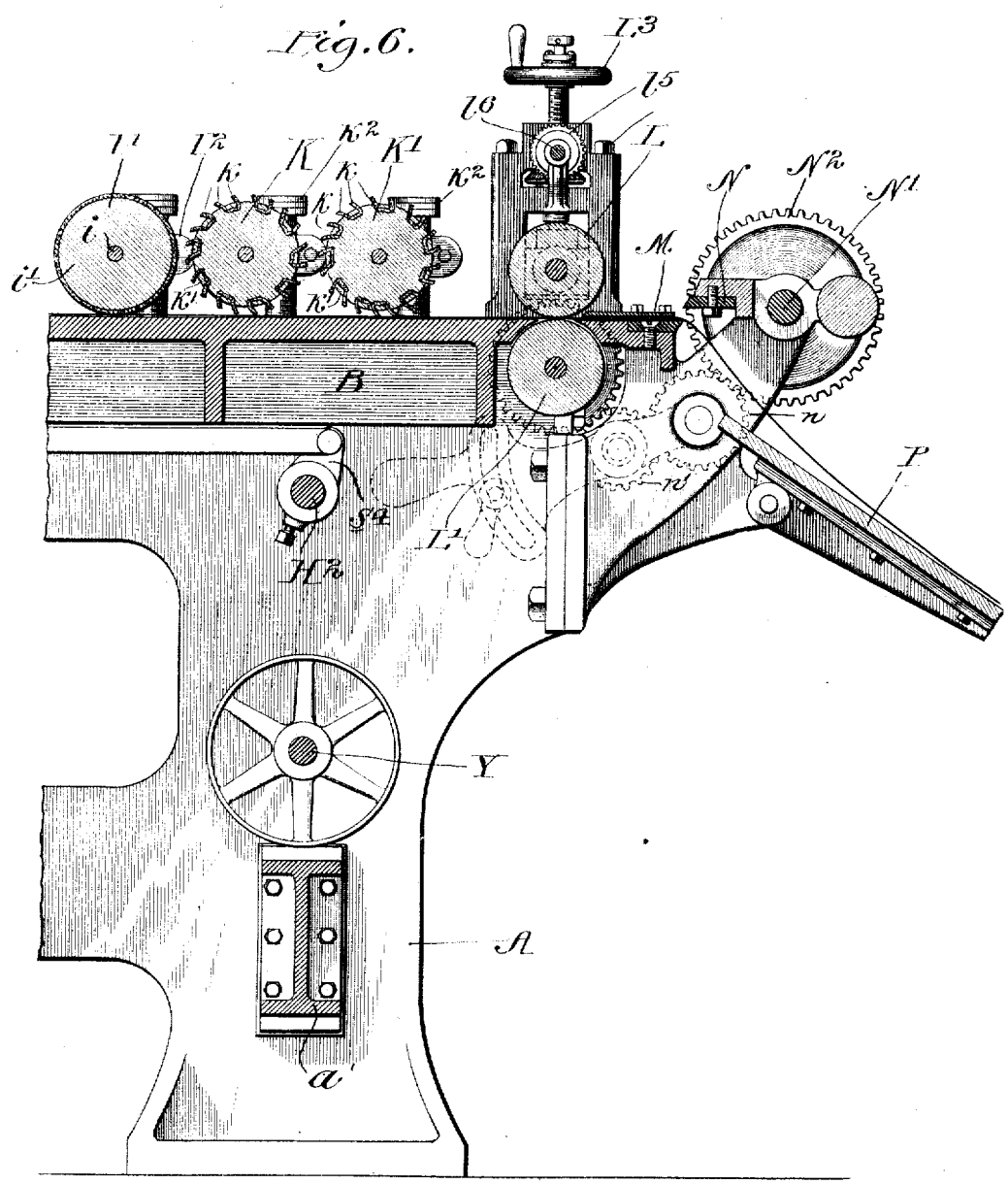

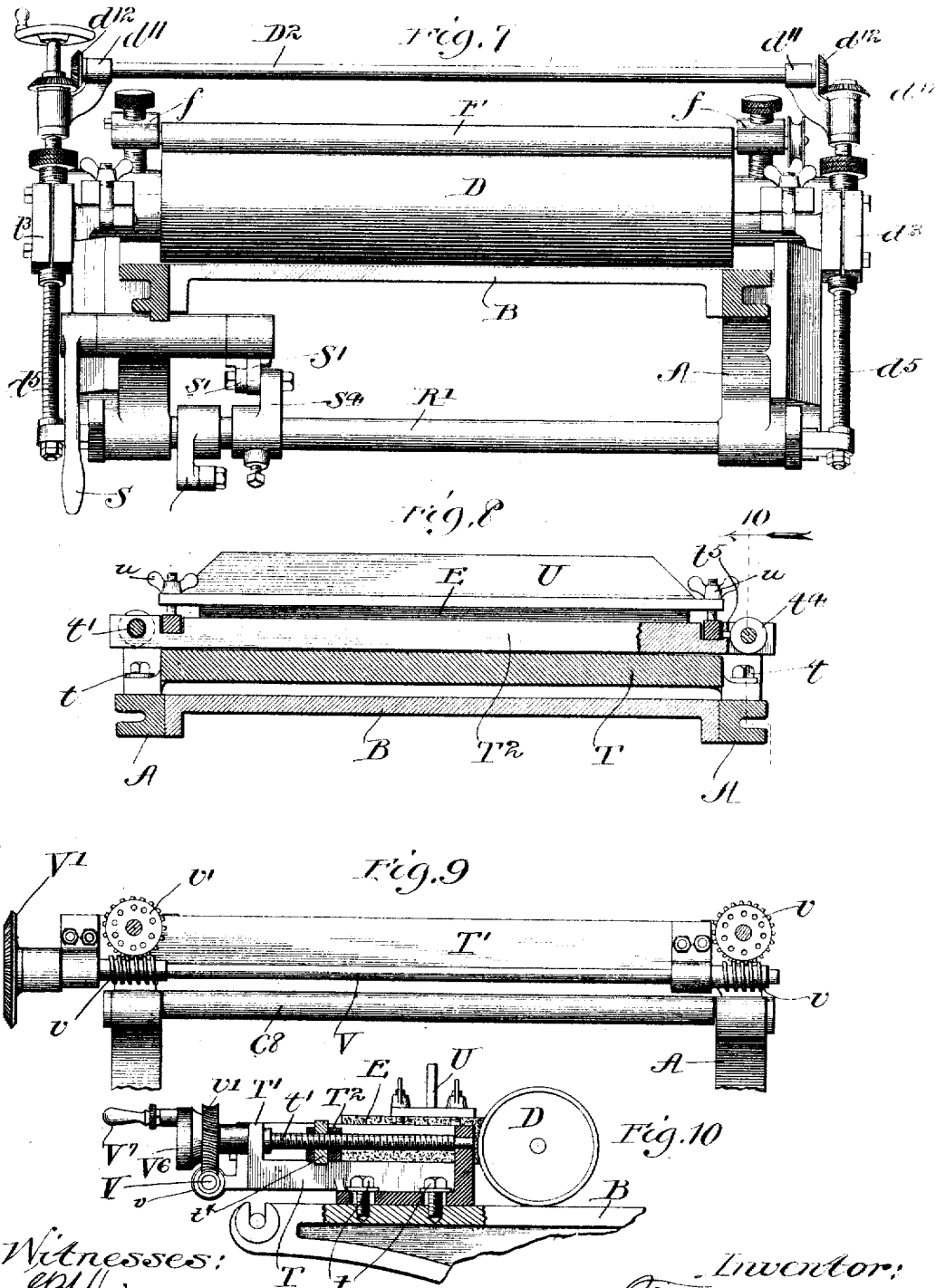

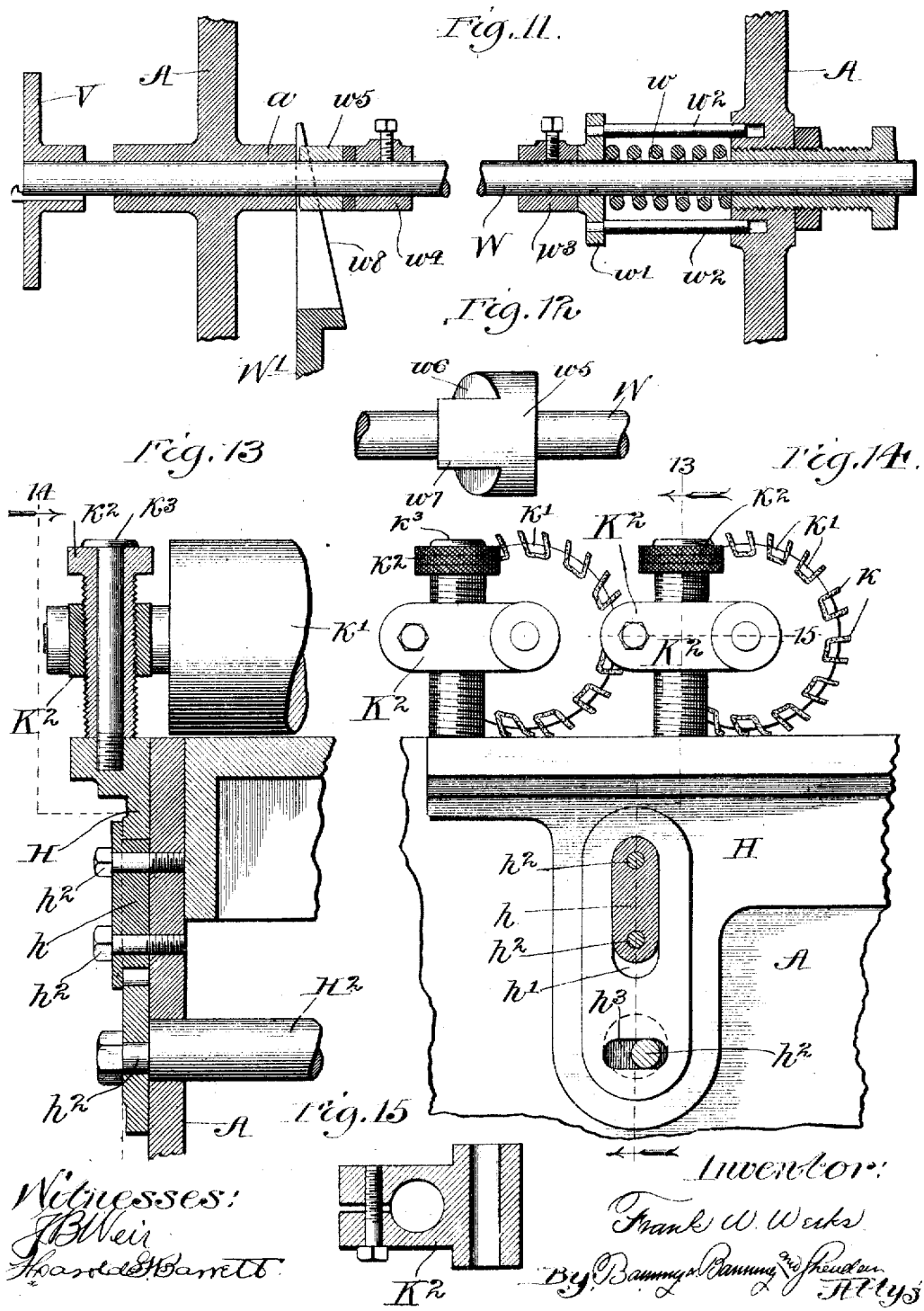

No. 665,844. Patented Jan. 8, 1901.
F. W. WEEKS.
MACHINE FOR MANUFACTURING CARBON COATED PAPER.
(Application filed Feb. 1, 1900.)
(No Model.) 10 Sheets—Sheet 9.
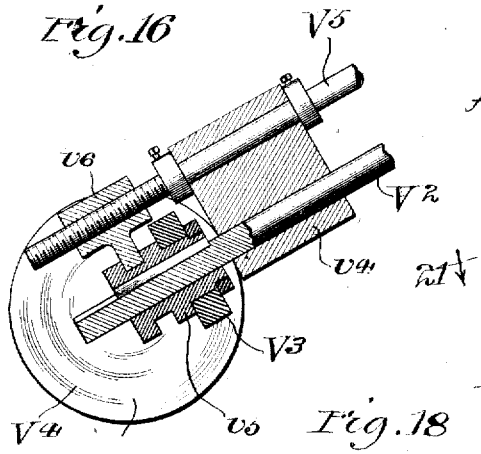
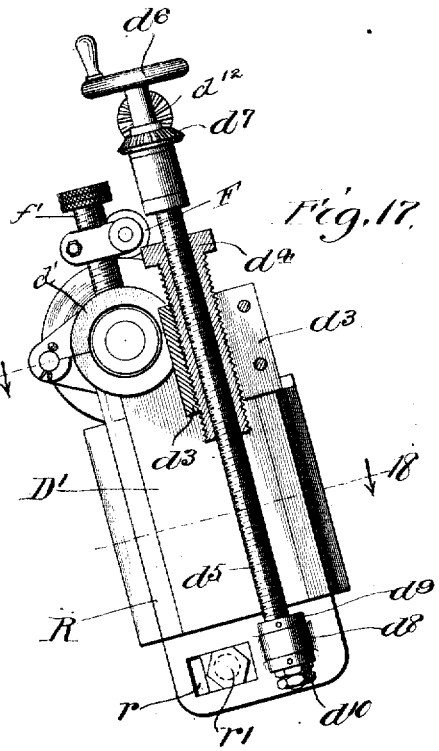
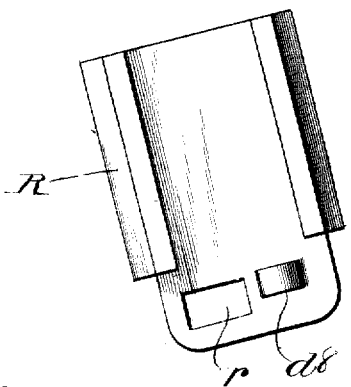
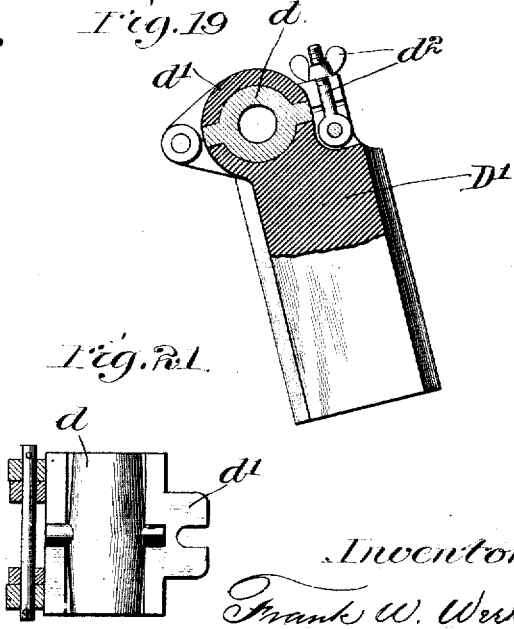
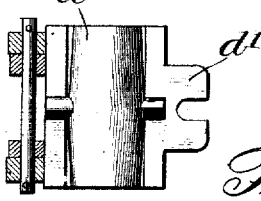

No. 665,844. Patented Jan. 8, 1901.
F. W. WEEKS.
MACHINE FOR MANUFACTURING CARBON COATED PAPER.
(Application filed Feb. 1, 1900.)
(No Model.) 10 Sheets—Sheet 10.
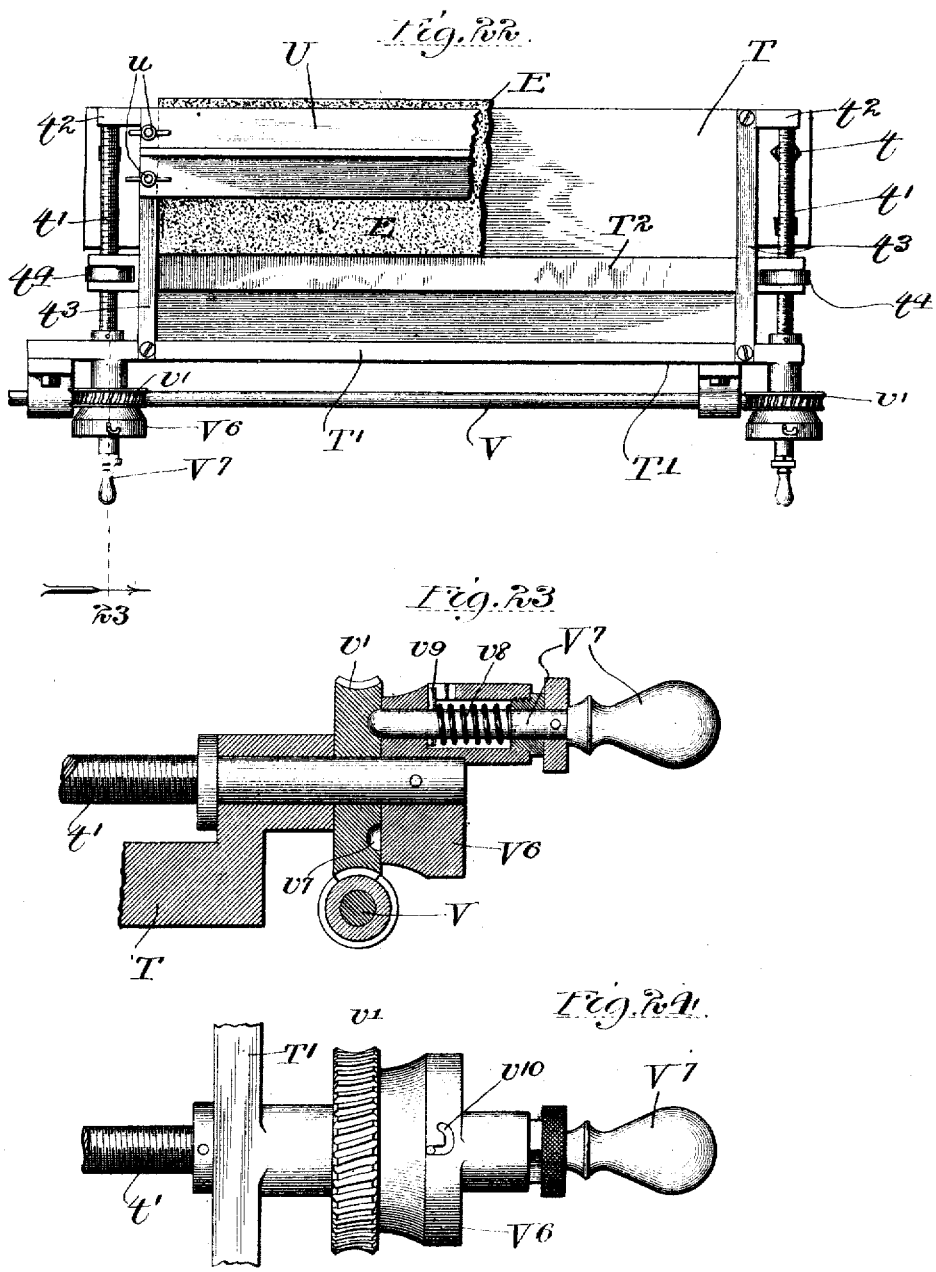

UNITED STATES PATENT OFFICE.

FRANK W. WEEKS, OF CHICAGO, ILLINOIS, ASSIGNOR, BY MESNE ASSIGNMENTS, TO THE GENERAL MANIFOLD COMPANY, OF FRANKLIN, PENNSYLVANIA.

MACHINE FOR MANUFACTURING CARBON-COATED PAPER.

SPECIFICATION forming part of Letters Patent No. 665,844, dated January 8, 1901.

Application filed February 1, 1900. Serial No. 3,578. (No model.)

*To all whom it may concern:*

Be it known that I, FRANK W. WEEKS, a citizen of the United States, residing at Chicago, in the county of Cook and State of Illinois, have invented certain new and useful Improvements in Machines for Manufacturing Carbon-Coated Paper, of which the following is a specification.

The principal object of the invention is to provide a simple, economical, and efficient machine for manufacturing carbon-coated paper.

A further object of the invention is to provide a simple, economical, and efficient machine with mechanism for applying a surface of carbon to a sheet of paper and to harden, finish, and polish the same.

The invention consists in the features, combinations, and details of construction hereinafter described and claimed.

In the accompanying drawings, Figure 1 is an elevation of one side of a machine constructed in accordance with these improvements; Fig. 2, a similar view of the reverse side of the machine; Fig. 3, a plan view of the machine looking at it from the top; Fig. 4, a plan sectional view taken on the irregular line 4 of Fig. 1 looking in the direction of the arrow. Figs. 5 and 6 are enlarged longitudinal sectional elevations of portions of the machine, taken on lines 5 and 6 of Fig. 3, each being a continuation of the other figure; Fig. 7, an enlarged cross-sectional view taken on line 7 of Fig. 5; Fig. 8, a similar view taken on line 8 of Fig. 5; Fig. 9, an end view of a portion of the machine looking at it from line 9 of Fig. 5; Fig. 10, a sectional detail taken on line 10 of Fig. 8; Fig. 11, an enlarged sectional detail taken on line 11 of Fig. 5 looking in the direction of the arrow; Fig. 12, an enlarged detail view of the engaging and disengaging collar shown as one of the parts in Fig. 11; Fig. 13, a sectional detail taken on line 13 of Fig. 14; Fig. 14, a detail view taken on line 14 of Fig. 13; Fig. 15, a sectional detail of one of the boxes, taken on line 15 of Fig. 14; Figs. 16 and 17, enlarged sectional details taken on lines 16 and 17 of Fig. 3 looking in the direction of the arrow; Fig. 18, a sectional detail taken on line 18 of Fig. 17; Fig. 19, a sectional detail of the slide shown in Fig. 17; Fig. 20, a detail view of the saddle-slide shown in Fig. 17; Fig. 21, a detail view in section taken on line 21 of Fig. 17; Fig. 22, a broken plan view of a portion of the mechanism for holding and feeding the cake of carbon or similar coloring material; Fig. 23, an enlarged sectional detail of the clutch mechanism, taken on line 23 of Fig. 22; and Fig. 24, a detail plan view of the clutch mechanism shown in Fig. 23 looking at it from the top.

In the art to which this invention relates it is well known that the ordinary carbon or manifold paper of commerce as usually manufactured is made by supplying the carbon to the paper in liquid form and by the aid of a brush. The resultant article is a paper having a supply of carbon thereon in a loose or soft condition which during the process of manufacturing has permeated the paper to such an extent as to discolor the opposite side and render it unfit for all purposes excepting that of making manifold copies or reproductions. A further objection to the usual article is that in handling the paper the carbon or coloring-matter comes off, so as to soil the fingers as well as to discolor adjacent sheets of paper with which it may come in contact. This old type of paper is generally used in what is known as the "interleafing" system of manifolding—that is, where carbon-sheets are interposed between two or more leaves of paper, so as to provide copies of the original imprint or impression. This method of using the paper is expensive, in that it requires considerable time to interleaf the sheets of carbon, and in cases where a large number of entries have to be made on different sheets of paper it occupies considerable time.

It has long been the desire of manufacturers and users of manifolding or carbon paper to produce by machinery or otherwise a paper provided with a surface of carbon or coloring material which has been fixed, hardened, and polished thereon in such a way as to enable the paper to be printed on one side and the user to handle or come in contact with the same without soiling the person of the user or the paper and other materials with which such paper might come in contact. To accomplish this result has heretofore been deemed impossible, and a vast amount of labor and time, entailing a great financial outlay, has been devoted by the manufacturers in trying to accomplish the result—namely, the production of paper with a hardened and finished carbon-surface—and hitherto without success.

The article produced by the improved process or method and the machine herein described are especially advantageous to the arts, in that railroad, express, telegraph, and large wholesale companies may have their paper prepared so that one side may be carbon-coated and the other printed in "blank," so as to use it for the purpose of making records, duplicates, and triplicates thereof at a minimum expense, thus saving immense files without the use of interleafing-sheets. The advantages are apparent in that considerable time is saved, the work of making a large number of entries facilitated as well as economized, while the objection of soiling the fingers and hands of the operator is minimized.

The principal object of my invention therefore is to manufacture a simple, economical, and efficient machine which will manufacture a paper having a fixed, hardened, and polished surface of carbon, and thereby remove the objections incident to the paper now in general use.

In constructing a machine in accordance with my improvements I provide a frame portion A of the desired size, shape, and strength to support the operative and other mechanisms in their desired position. This frame portion, as shown in the drawings, consists of two standards secured together by means of the tie-rods $a$ and $a'$, Figs. 5 and 6, extending transversely from one standard to the other, and at its upper portion with a bed B, upon which the paper travels, as will be more fully hereinafter described.

To support a roll of paper which it is desirable to carbon-coat, one end of the machine is provided with a shaft C, upon which the roll of paper $c$ is wound, and such shaft is removably secured in position by means of the pins $c'$ and $c^2$, Figs. 1 and 4, one of which, $c^2$, is passed directly across the journal part of the shaft (see Fig. 4) and the other across the boxes $c^3$. It is desirable to keep the paper as it leaves the roll in a taut condition—in other words, to apply a brake to the shaft or some portion thereof, so that when the operative mechanism is stopped the roll will not continue its rotations. To accomplish this result, one end of the machine is provided with a flanged brake-wheel C', Figs. 2 and 4, the tread portion of which is engaged by two shoes $c^4$ and $c^5$. These shoes are pivotally secured to two oscillating levers C² and C³, pivoted to the frame at $c^6$ and resembling somewhat an ice-tongs. The free end of one of these levers is provided with a bolt C⁴, pivoted thereto and having its free end passed through a perforation in the other swinging lever. The end of the bolt is threaded and provided with a hand-screw $c^7$, between which and the perforated lever is inserted a spring $c^8$. The arrangement of parts is such (see Fig. 2) that by turning the hand-wheel one way or the other the shoes are pressed with greater force against the brake-wheel or released therefrom, so that the operator can control, as seems desirable, the rotation of the roll of paper.

To apply a surface of carbon to the paper, (see Fig. 5,) the paper is brought up over an idler-roll $c^8$ and over the upper surface of the bed and in contact therewith. Arranged adjacent to the front end of the machine is a carbon-supplying roll D, formed of a central shaft, a wood drum, and an outer covering of felt wound around the same. One portion of this roll is in contact with a cake of carbon E or other coloring material, more fully hereinafter described, and another portion of the surface of the roll is in contact with the paper. It is desirable to arrange the journal portion of this carbon-supplying roll in adjustable bearings, so that it can be pressed against the paper with the desired amount of friction. In order to accomplish this result, the shaft of the carbon-supplying roll has its journal portions rotatably mounted in boxes $d$, Fig. 2, at or near each end thereof, which in turn are held in position upon the primary slides D', (see Figs. 2, 17, 18, and 19,) and the slide is provided with a hinged cap $d'$, pivoted thereto in such a manner that it may be thrown back to remove the box or swung into closed position, as shown in Fig. 19, to confine the box. This hinged cover is slotted at its free end, so that it may be clamped by a thumb-nut and bolt $d^2$. It is also desirable to provide means by which these boxes may be raised independently and simultaneously. In order to accomplish this result, each of the slides has a projecting split lug $d^3$ extending outwardly therefrom, as shown in Fig. 17, in which is inserted a nut $d^4$, threaded on the inside and outside. Inserted into the threaded axial opening of this nut is an adjusting-screw $d^5$, the upper end of which is provided with a hand-wheel $d^6$ and a bevel-gear $d^7$. The lower end of this adjusting-screw has its bearing rotatably mounted in a lug $d^8$ and is prevented from having endwise movement by means of a collar $d^9$ and the lock-nuts $d^{10}$. It will be readily seen from an examination of Fig. 17 that as the hand-wheel is turned in one direction or the other the slide D' is moved upwardly or downwardly, carrying with it the end of the color-supplying roll away from or toward the paper to be carbon-coated.

Both slides are provided with adjusting mechanism, as shown in Figs. 7 and 17, and in order, therefore, to transmit power and motion from the single hand-wheel to both of the adjusting-screws a cross-shaft $D^2$ is provided and mounted in bearings $d^{11}$ at or near each end thereof. Each end of this cross-shaft is provided with a bevel-pinion $d^{12}$, engaging with the bevel-pinions on the upper ends of the adjusting-screws, as shown clearly in Fig. 7, so that as the hand-wheel is turned in either direction it imparts a simultaneous and similar rotation to each of the adjusting-screws. Independent adjustment of the slides is obtained by turning the sleeve-nuts $d^4$ in either direction.

The coloring material in this kind of a machine is preferably made of a composition of carbon or other desirable coloring-matter mixed with wax and tallow, made in the shape of a cake, and of the consistency of hard soap, and which may be conveniently termed "practically-hard carbon;" but owing to irregularities in density and distribution of the material forming the color-cake the color-supplying roll usually takes up more material than is necessary or takes it in patches, and this in spite of the fact that feeding mechanism, hereinafter described, minimizes this objection. In order to get rid of this surplus and distribute the material evenly over the color-supplying roll, an "evening-roll" F, Figs. 5 and 7, is provided and rotatably mounted in suitable bearings $f$ at each end thereof, so that it may contact the color-supply roll throughout its length. These bearings are adjustably held in position on the threaded sleeves $f'$, which sleeves are arranged upon studs $f^2$, having threaded ends engaging the caps of the slides D', Figs. 2 and 17. A detail view of a similar structure to this sleeve and stud is shown in a stud and sleeve on the left upper portion of Fig. 13 and will be more fully hereinafter described. From the foregoing it will be seen that either or both ends of this evening-roll can be raised or lowered whenever desirable or necessary, so as to remove as much or as little of the surplus coloring material from the color-supply roll as may seem desirable or necessary.

Color having been supplied to the paper by means of the color-supplying roll D, it is left in a more or less imperfect condition—that is, the carbon is practically in a soft condition on the paper, and it becomes necessary to permanently affix the coating of carbon to the surface of the paper and harden and finish the same. In order to accomplish this result, a pair of rubbing-rolls G and G', Figs. 3 and 5, are provided and arranged in suitable bearings, so that they rotate with their lower surfaces in contact with the carbon-coated surface of the paper. It is desirable that these rolls, the outer surfaces of which are preferably formed of felt or like material, be given a reciprocating motion longitudinally of the rolls or transversely of the machine across the face of the paper, as well as a rotary motion, which will not only serve to more effectually distribute the carbon on the paper and rub it into the same, but breaks up any tendency toward making lines or giving the surface of the carbon a grain-like appearance. In order to reciprocate the rubbing-rolls, one end of each of the shafts is provided with a grooved collar $g$ and $g'$, adapted to be engaged by yokes $g^2$, secured to a vibrating platen $g^3$. (See Figs. 2 and 3.) This platen is secured to a rock-shaft $G^2$, having a crank $g^4$ at its lower end, the pin of which engages with a grooved cam $g^5$, mounted upon one end of a rotating shaft $g^6$. (See Figs. 2 and 4.) It is desirable that each of these rubbing-rolls have an independent adjustment by which it may be lowered toward or raised away from the carbon surface of the paper, so as to provide the necessary friction for rubbing the carbon into the paper. In order to accomplish this result, the journals of the shaft are mounted in bearings $G^3$ at or near each end of the stem, and these bearings in turn are mounted upon threaded sleeves, which also in turn are rotatably mounted upon studs $g^7$, screw-threaded into a frame portion H, Figs. 1 and 2, which is slidingly mounted, as hereinafter described, upon each side of the main frame of the machine. A detail view of a structure exactly similar to this adjustable screw-sleeve is shown in a similar sleeve and stud at the upper left-hand side of Fig. 13, which will be more fully hereinafter described when considering that figure.

After the carbon or coloring material has been rubbed in, as above described, it is desirable to clean the surface of the paper, and for this purpose two cleaning-rolls I and I' are provided and rotatably mounted in suitable bearings, so that their surfaces will contact the colored surface of the paper and clean off the surplus amount of material which remains after the rubbing-rolls have done their work. These cleaning-rolls are composed of steel central shafts $i$, which furnish the journal therefor and support pine drums $i'$ thereon, Figs. 5 and 6. These wooden drums are provided with an outer surface of mohair plush and preferably should be about five inches in diameter. The cleaning rolls or journals thereof are mounted in bearings $I^2$ upon threaded adjustable sleeves $I^3$, similar in their construction to the adjustable sleeves hereinbefore described and as shown in Fig. 13, by which the rolls may be moved toward or from the surface of the paper whenever desirable or necessary. The studs of these sleeves are also mounted on the sliding frame above described.

When the operation of cleaning the carbon-coated surface of the paper has been accomplished, it is desirable to polish the surface of the same, and in order to do this a pair of polishing-rolls K and K' are preferably provided. These polishing-rolls (see Figs. 6 and 14) are formed of rotatable shafts and pine drums carrying a multiplicity of wing portions $k$, let into the cylindrical surface of the drum and held in place in any desired manner, preferably by the strips of metal $k'$.

These wing portions are formed of felt or similar material, which as the rolls are rotated rapidly remove any surplus material on the paper and give a polish unto the hardened surface thereof. The shafts of these rolls are mounted in adjustable bearings $K^2$, which in turn are mounted upon the adjusting screw-threaded sleeves $k^2$. These sleeves are mounted upon studs $k^3$, (see Fig. 13,) let into the sliding frame H, so that the sleeves may be turned in either direction to raise and lower the adjustable bearings.

It will be appreciated that the strip of paper should be drawn over or fed across the bed of the machine and against the direction of rotation of the color-supply, rubbing, cleaning, and finishing rolls. A careful examination of the above description and drawings will show that it is far preferable to draw the paper across the same from one end of the bed of the machine, for the reason that color-supplying, rubbing, cleaning, and finishing rolls will then act to spread and evenly distribute the carbon on the paper rather than simply rolling over the carbon, which act would not so evenly distribute and finish the carbon. In order to accomplish this result—the feeding of the paper along the bed of the machine in an economical and efficient manner—upper and lower feed-rolls L and L', Figs. 2 and 6, are provided. These feed-rolls are formed of a central steel shaft $l$ and drums of suitable material. The lower shaft has its journals rotatably mounted in the bed of the machine, while the upper shaft is journaled in boxes $l'$, slidingly mounted in standards $l^2$, (see Fig. 2,) so that it may be raised and lowered whenever desirable or necessary. The raising and lowering of the upper roll are accomplished by means of a screw $L^2$, having a hand-wheel $l^3$, the lower end of the screw engaging with the sliding box and the threaded portion of the screw, as shown in Figs. 2 and 6, engaging with a cross-bar of the standard.

It is desirable, and in fact necessary, that both the journals of the upper feed-roll be raised and lowered at the same time. In order to accomplish this result, the adjusting-screws are provided with beveled pinions $l^4$, relatively slidingly mounted upon the screws and engaging with similar beveled pinions $l^5$, (see Fig. 3,) mounted upon a cross-shaft $l^6$, (particularly shown in Fig. 3,) so that as the hand-wheel $L^3$ upon one of the adjusting-screws is rotated both of the adjusting-screws are rotated in a similar direction and serve to raise and lower both ends of the feed-rolls simultaneously.

The lower feed-roll is provided with a driven gear $L^4$, mounted on one end of its shaft, (see Fig. 1,) engaging with a pinion $l^7$, which is connected to a driving-pulley $L^5$, arranged to be driven from the main driving-shaft. The driving-gear $L^4$ meshes with the gear $L^6$ on the upper feed-roll, so as to operate or drive the same. The other end of the lower feed-roll (see Fig. 2) is provided with a spur-gear $L^7$, arranged to engage with a train of gears, hereinafter described, and operate the mechanism for cutting the paper into sheets.

When the carbon-coated surface of the paper has been polished, it is practically finished and it can, if desired, be brought into engagement with the second drum (not shown) and rolled around thereon, upon which it may be kept for such future use as may be desirable or necessary. In the present instance, however, it is preferable to cut the strip of carbon into sheets of the desired size, and in order to accomplish this result one end of the bed of the machine is provided with a "ledger" or cutter bar M, adapted to be contacted by a rotating cutter N, mounted upon a shaft N', by which it is rotated. (See Fig. 6.) This shaft is given its rotation by means of a spur-gear $N^2$, which in turn is operated by means of intermediate gears $n$ and $n'$, Figs. 2 and 3, which mesh with and are operated by the gear $L^7$ on the lower feed-roll. These intermediate gears are mounted upon a swinging arm $o$, which has a segmental groove $o$ therein, through which a clamping bolt and nut $o'$ is passed. From this construction it will be seen that the rotating cutter can be thrown into and out of action whenever desirable or necessary and also that the size of the gear on the lower feed-roll can be changed to regulate the length at which the sheet of paper will be cut. For instance, if it is desired to cut the longest sheet possible, then the smallest gear that it is possible to put on the lower feed-roll should be placed thereon. When it is desirable to cut as short a sheet as possible, then the largest gear that can be placed on the lower feed-roll should be placed thereon, so as to operate or rotate the cutter-bar as rapidly as possible.

When the strip of paper has been cut into the desired lengths, as shown in Fig. 6, the sheets fall into a "jog-box" P, from which they may be removed whenever desirable or necessary.

There are times in the operation of a machine of this class when it is necessary to raise all of the rolls—such as the color-supplying, rubbing, cleaning, and polishing rolls—from contact with the carbon surface of the paper. This, if possible, should be done at one and the same time or during the same operation. In order to accomplish this result, the rubbing, cleaning, and polishing rolls have their adjustable sleeves mounted upon the sliding frame H, above referred to. This sliding frame, which is formed of two sliding brackets, one on each side of the main frame, is held in position by shouldered guides $h$, Figs. 13 and 14, which pass through elongated perforations $h'$ therein. These guides, as suggested, are made in the form of elongated shoulder-pieces resembling caps, which are secured to the main frame of this machine by means of cap-screws $h^2$. (See Fig. 13.) Two rock-shafts H' and $H^2$ (see Figs. 5 and 6) are provided, having eccentric pins $h^2$, Figs. 13 and 14, extending outwardly from each end thereof and engaging elongated openings $h^3$ in the sliding frame, so that as the rock-shafts are vibrated the sliding frame is raised or lowered.

The means provided for raising and lowering the color-supplying roll from and into contact with the paper to be carbon-coated, at the same time that the rubbing and other rolls are raised or lowered in the slide D', (shown in Figs. 17, 18, 19, and 20,) is slidingly mounted in a secondary or saddle slide R, which in turn is slidingly mounted on the frame of the machine. The lower end of this saddle is provided with a slot $r$, engaged by an eccentric-pin $r'$, extending out from a rock-shaft R', Fig. 5, so that as this rock-shaft is vibrated the saddle R is raised and lowered, which as a consequence raises and lowers the color-supplying roll. To vibrate all these rock-shafts H', $H^2$, and R' at the same time, an operating-lever S is provided and vibratingly mounted upon a rock-shaft $s$. The other end of this rock-shaft $s$ (see Figs. 5 and 7) is provided with a lever S', connected, by means of the links $s'$, $s^2$, and $s^3$, Figs. 5 and 6, with lever-arms $s^4$ upon each of the rock-shafts, so that as the operating-lever S is vibrated a similar vibration is given to all of the rock-shafts, which raises and lowers the slides and sliding frame, thus raising and lowering all of the operating-rolls, color-supplying rolls, &c., from and into contact with the paper to be operated upon.

The color-supplying material is made, as above stated, in the shape of a brick and of about the consistency of hard soap. Means should be provided by which it can be automatically fed to the color-supply roll in the desired amount and at the desired rate of speed. In order to accomplish this result, a color-holding frame or box is provided, having its base T, Figs. 1 and 2, secured to the bed of the machine in any desired way, preferably by means of the cap-screws $t$, (see Fig. 10,) by which it is held in fixed position. It will be readily seen, however, that the loosening of these cap-screws will permit of the frame being moved inwardly or outwardly, as may be desirable or necessary. This carbon-supporting frame has an upwardly-extending flange T' at its rear edge, through which two feed-screws $t'$ are passed and in which they are rotatably mounted, the front end of which frame is also provided with two lugs $t^2$, one at each side thereof, in which the ends of the feed-screws are supported and also rotatably mounted. A follower-bar $T^2$ is slidingly mounted on the bed of the color-box and grooved, (see Fig. 8,) so that guides $t^3$ may be inserted therein. The outer ends of the follower are slotted, and in these slots are loosely inserted nuts $t^4$, prevented from rotating by having pins $t^5$ engaging with holes in the follower. The feed-screws are passed through these nuts and are in threaded engagement therewith, so that as the feed-screws are turned in one direction or the other the follower-plate is moved forwardly or backwardly either to force the cake E of coloring material toward the color-supply roll or permit a fresh cake to be inserted therein. A removable cap portion U, Figs. 8 and 22, is held by thumb-screws $u$ in engagement with the color or carbon box to prevent the easy withdrawal of the cake of coloring material and also its being raised out of the box during the rotation of the color-supplying roll.

To operate the feed-screws, a cross-shaft V is provided, having worms $v$ (see Fig. 9) engaging with the worm-gears $v'$ on the outer ends of the feed-screws. One end of the cross-shaft is provided with a beveled gear V', which is meshed with a bevel-pinion $v^2$, Figs. 2 and 3. This bevel-pinion is mounted upon an intermediate shaft $V^2$, which is journaled in fixed bearings $v^3$ and $v^4$. (See Figs. 2 and 16.) The opposite end of this intermediate shaft $V^2$ is provided with a friction-wheel $V^3$, engaging with the face of a friction-disk $V^4$, so that as the friction-disk is rotated the intermediate shaft $V^2$ is also rotated, which in turn rotates the bevel-pinion $v^2$ and gear V', the cross-shaft, and by means of intermediate mechanism the feed-screws.

It is desirable to vary the feed of the cake of coloring material to suit different circumstances and conditions, and in order to accomplish this result the friction-wheel above referred to is rotatably mounted upon a sleeve $v^5$, Fig. 16, which in turn is slidingly mounted upon the intermediate shaft. This sleeve has a nut portion $v^6$, extending outward therefrom and adapted to be engaged by an adjusting-screw $V^5$, so that as the adjusting-screw is rotated in the one direction or the other the friction-wheel is moved toward or away from the center of the friction-disk, which necessarily increases or decreases the speed of the intermediate rotatable shaft, and thereby the speed at which the cake of coloring material is fed toward the color-supply roll.

There are times when it may be desirable to feed one end of the cake of coloring material toward the color-supplying roll and permit the other to remain stationary, to arrest the feeding movement of the cake of coloring material, or to move the follower backwardly and insert a fresh cake without stopping the machine. In order to accomplish this result, (see Figs. 22, 23, and 24,) the worm-gears above referred to are loosely mounted upon the ends of the feed-screws. Disks or plates $V^6$ are secured to the end of the feed-screws adjacent to the worm-gears, the faces of both of which are in direct contact. These plates are provided with holding-pins $V^7$, the ends of which are adapted to engage with indentations $v^7$ in the face of the worm-gears. Helical springs $v^8$ serve to hold these pins in engagement with the indentations, so that as the gears are rotated the feed-screws are likewise rotated. These holding-pins are provided with transverse pins $v^9$, passed through irregular perforations $v^{10}$ in the plates, so that as the holding-pins are drawn backwardly they may be also turned a step into the laterally-extending portion of the irregular slot $v^{10}$ to hold them out of engagement with the worm-gears and permit the engagement of such gears without a consequent rotation of the feed-screws.

It is also desirable when the supplementary sliding bed, with the different operating-rolls, is raised or lowered into position that the mechanism for feeding the cake of coloring material be stopped from further movement, or put into operation, respectively. In order to accomplish this result, the friction-disk $V^4$ is mounted upon a shaft W, Figs. 4, 5, and 11, which has a sliding as well as a rotatable motion in its bearings. This shaft is held against the hub or "boss" $a$ at one side by means of the spring $w$, which presses against a collar $w'$, loosely surrounding the shaft, and which is prevented from rotating by means of the pin $w^2$, inserted into the main frame of the machine. This loose collar presses against a collar $w^3$, rigidly secured to the shaft, which forces a second collar $w^4$ on the shaft to force a loose cam-collar $w^5$ against the hub or boss $a$. This cam-collar $w^5$ has a cam or inclined surface $w^6$, Fig. 12, and a projection $w^7$, which enters into and engages the slot of a bifurcated shifting bar $W'$, (see Figs. 5 and 11,) which has an inclined surface $w^8$, that presses against the inclined surface of the loose collar $w^5$. As the operating-handle S is moved downwardly and inwardly the shifting bar is also moved inwardly to press against the cam-collar and force the shaft, with its friction-disk, inwardly and out of contact with the friction-wheel and at the time when the supplementary bed and operating-rolls are being raised from contact with the paper. A reverse movement of the operating-lever permits the engagement of the friction-disk and friction-wheel at the time when the operating-rolls are being lowered into contact with the paper. The different rolls, shafts, and other mechanisms are operated by means of a main shaft Y, which is connected with all of the same by means of proper belts, as shown in Figs. 1 and 4. It is unnecessary and practically undesirable to letter or indicate these different belts and follow them by index-letters, as it would only tend to obscure the drawings. They are so plainly drawn, however, that it will be seen at a glance that they are all connected directly or indirectly with the main driving-shaft Y, which is provided with a main driving-pulley $y$, in turn adapted to be connected with any suitable prime mover.

I claim—

1. In a machine for supplying practically-hard carbon to the surface of paper, the combination of means for applying carbon to the surface of a sheet of paper, roll mechanism for distributing and rubbing the carbon evenly into the paper, roll mechanism for cleaning the applied-carbon surface, roll mechanism for polishing the surface of the applied carbon, and means for raising and lowering such roll mechanisms away from and into contact with the surface of the paper, substantially as described.

2. In a machine of the class described, the combination of roll mechanism for applying the carbon to the paper, roll mechanism for rubbing the applied carbon into the paper, roll mechanism for polishing the applied carbon, and means for independently and means for simultaneously raising and lowering the roll mechanisms away from and into contact with the surface of the paper, substantially as described.

3. In a machine for supplying practically-hard carbon to the surface of paper, the combination of a main frame, roll mechanism for applying the carbon to the paper, slides on the frame of the machine in which the said roll mechanism is rotatably mounted, and roll mechanism for distributing, cleaning and finishing the carbon on the surface of the paper, substantially as described.

4. In a machine of the class described, the combination of a main frame, roll mechanism for applying carbon to a sheet of paper, slide mechanism mounted in the frame of the machine in which the carbon-applying roll mechanism is rotatably mounted, a supplementary frame slidingly mounted on the main frame of the machine, roll mechanism for operating on the applied carbon and rotatably mounted on the supplementary frame, and means for raising and lowering such supplementary frame into and out of contact with the paper to be operated upon, substantially as described.

5. In a machine of the class described, the combination of a main frame, roll mechanism for applying carbon from a cake to the surface of a sheet of paper, slide mechanism slidingly mounted in the frame of the machine in which the carbon-applying roll mechanism is rotatably mounted, a supplementary frame slidingly mounted on the main frame, roll mechanisms for distributing, cleaning and polishing the applied carbon on the surface of the paper and rotatably mounted on the supplementary frame, and means for raising and lowering the supplementary frame and slide mechanism upon which the operating-rolls are mounted, substantially as described.

6. In a machine of the class described, the combination of a main frame, roll mechanism for applying carbon from a cake to the surface of a sheet of paper, slide mechanism slidingly mounted in the frame of the machine in which the carbon-applying roll mechanism is rotatably mounted, a supplementary frame slidingly mounted on the main frame, roll mechanisms for distributing, cleaning and finishing or polishing the applied carbon on the surface of the paper and rotatably mounted on the supplementary frame, and means for simultaneously and means for independently raising and lowering the supplementary frame and slide mechanism upon which the operating-rolls are mounted, substantially as described.

7. In a machine for supplying practically-hard carbon to the surface of paper, the combination of roll mechanism for applying carbon to the surface of a strip of paper, roll mechanism for distributing and finishing the applied carbon on the surface of the paper, and rotatable cutting mechanism for cutting the sheet or strip of paper into sheets of a desired size, substantially as described.

8. In a machine for supplying practically-hard carbon to the surface of paper, the combination of roll mechanism for applying carbon to the surface of a strip of paper, roll mechanism for distributing and finishing the applied carbon on the sheet of paper, roll mechanism for pulling the strip of carbon-coated paper through the machine, and a rotatable cutter for cutting the strip of paper into sheets of a desired size, substantially as described.

9. In a machine of the class described, the combination of a main frame, roll mechanism for applying carbon to the surface of a strip of paper, slide mechanism slidingly secured to the frame of the machine in which the carbon-applying roll is rotatably mounted, a supplementary frame slidingly mounted on the main frame, roll mechanism for distributing, cleaning and finishing the applied-carbon surface and rotatably mounted on the supplementary frame, screw mechanism for raising and lowering one portion of the slide mechanism to independently raise and lower the carbon-applying roll, and lever mechanism for raising and lowering the slide mechanism and the supplementary frame with their rolls simultaneously into and out of contact with the paper, substantially as described.

10. In a machine of the class described, the combination of a main frame, slide mechanism slidingly secured to the frame of the machine, roll mechanism for applying carbon to the surface of a strip of paper and rotatably mounted in the slide mechanism, a supplementary frame slidingly mounted on the main frame, roll mechanism for distributing, cleaning and finishing the surface of the applied carbon, and rotatably mounted on the supplementary frame, screw mechanism for raising and lowering one portion of the slide mechanism to independently raise and lower the carbon-applying roll, lever mechanism for raising and lowering the slide mechanism and the supplementary frame with their rolls simultaneously into and out of contact with the paper, and roll mechanism for drawing the strip of paper through the machine and in contact with the carbon-applying and finishing roll mechanism, substantially as described.

11. In a machine of the class described, the combination of a main frame, slide mechanism slidingly secured to the frame of the machine, roll mechanism for applying carbon to the surface of a strip of paper and rotatably mounted in the slide mechanism, a supplementary frame slidingly mounted on the main frame, roll mechanism for distributing, cleaning and finishing the surface of the applied carbon rotatably mounted on the supplementary frame, screw mechanism for raising and lowering one portion of the slide mechanism to independently raise and lower the carbon-applying roll, lever mechanism for raising and lowering the slide mechanism and the supplementary frame with their rolls simultaneously into and out of contact with the paper, roll mechanism for drawing the strip of paper through the machine and in contact with the color-applying and finishing roll mechanism, and cutting mechanism rotatably mounted on the frame of the machine for cutting a strip of paper into sheets of the desired size, substantially as described.

12. In a machine for supplying practically-hard carbon to the surface of paper, a frame portion having a rigid bed or upper surface upon which a strip of paper is supported to be operated upon, roll mechanism at or near one end of the bed for applying carbon to the surface of the paper, roll mechanism for distributing, cleaning and finishing the applied carbon and the surface thereof, two feed-rolls rotatably mounted in the frame of the machine at or near the other end of the bed between which a strip of paper may be passed for drawing it over the bed while being operated upon, and means for raising and lowering one of the feed-rolls out of and into contact with the paper so as to obtain the desired grip on the paper, substantially as described.

13. In a machine of the class described, a frame portion having a rigid bed or upper surface upon which a strip of paper is supported to be operated upon, roll mechanism at or near one end of the bed for applying carbon to the surface of the paper, roll mechanism for distributing, cleaning and finishing the applied carbon and the surface thereof, two feed-rolls rotatably mounted in the frame of the machine at or near the other end of the bed between which a strip of paper may be passed for drawing it over the bed while being operated upon, means for raising and lowering one of the feed-rolls into and out of contact with the paper so as to obtain the desired grip on the paper, and cutting mechanism rotatably mounted outside of and adjacent to the feeding-rolls for cutting the strip of paper into sheets of the desired size, substantially as described.

14. In a machine of the class described, the combination of a main frame portion, roll mechanism for applying practically-hard carbon to the surface of paper, primary slide mechanism in which the roll mechanism is rotatably mounted, secondary slides slidingly mounted in the frame of the machine in which the primary slides are slidingly mounted, and screw mechanism engaging both slides to adjust the position of the primary slides, substantially as described.

15. In a machine of the class described, the combination of a main frame portion, roll mechanism for applying practically-hard carbon to the surface of paper, primary slide mechanism in which the roll mechanism is rotatably mounted, secondary slides slidingly mounted in the frame of the machine in which the primary slides are slidingly mounted, screw mechanism engaging both slides to adjust the position of the primary slides, spur-pinions on the screws, and an intermediate shaft provided with spur-pinions at or near each end engaging with the spur-pinions on the adjustable screws, whereby the rotation of one screw is imparted to the other and both the primary slides adjusted simultaneously, substantially as described.

16. In a machine of the class described, the combination of a main frame, roll mechanism for applying practically-hard carbon to the surface of paper, primary slide mechanism in which the roll mechanism is rotatably mounted, secondary slide mechanism slidingly mounted on the frame of the machine in which the primary slides are slidingly mounted, an adjustable nut in each primary slide, and adjustable screw mechanism rotatably engaging the secondary slides and the adjustable nuts in the primary slides, substantially as described.

17. In a machine of the class described, the combination of a main frame, roll mechanism for applying practically-hard carbon to the surface of paper, primary slide mechanism in which the roll mechanism is rotatably mounted, secondary slide mechanism slidingly mounted on the frame of the machine in which the primary slides are slidingly mounted, an adjustable nut in each primary slide, adjustable screw mechanism rotatably engaging the secondary slides and the adjustable nuts in the primary slides, spur-pinions on the adjustable screws, and an intermediate shaft provided with a spur-pinion at each end engaging the spur-pinions on the adjustable screws, whereby independent and simultaneous adjustments may be given the primary slide mechanism, substantially as described.

18. In a machine of the class described, the combination of a main frame, roll mechanism for applying practically-hard carbon to the surface of paper, primary slide mechanism in which the roll mechanism is rotatably mounted, secondary slide mechanism slidingly mounted on the frame of the machine in which the primary slides are slidingly mounted, an adjustable nut in each primary slide, adjustable screw mechanism rotatably engaging the secondary slides, adjustable nuts having threaded openings in which the screws rotatably engage, spur-pinions on the adjustable screws, an intermediate shaft provided with a spur-pinion at each end engaging the spur-pinions on the adjustable screws, whereby independent and simultaneous adjustments may be given the primary slide justments may be given the primary slide mechanism, a rock-shaft engaging with the secondary slides, and means for rocking the rock-shaft, whereby the secondary slides and all attached mechanisms are raised or lowered simultaneously, thereby carrying the carbon-applying roll mechanism away from and into contact with the paper, substantially as described.

19. In a machine of the class described, the combination of a main frame portion, roll mechanism for applying practically-hard carbon to the surface of a strip of paper with which the roll contacts, primary slide mechanism in which the bearings of the roll are rotatably mounted, a hinged cap for confining the bearings of the rotatable roll in the primary slides, a cleaning or scraping roll rotatably mounted adjacent to the surface of the carbon-applying roll, adjustable screw mechanism mounted on the caps of the primary slides and adjustably supporting the bearings of the color-scraping roll, secondary slide mechanism slidingly mounted on the frame of the machine in which the primary slides are mounted, and means for raising and lowering the secondary slides independently and simultaneously, substantially as described.

20. In a machine of the class described, the combination of a main frame, carbon-applying roll mechanism rotatably mounted thereon for supplying carbon to the surface of a strip of paper with which said roll contacts, a supplementary frame comprising two parts, one part slidingly mounted on each side of the main frame, roll mechanism for distributing, cleaning and finishing the applied carbon and the surface thereof and mounted upon the supplementary frame mechanism, two rock-shafts vibratingly mounted in the frame of the machine and engaging the supplementary frame so as to raise and lower the same, and lever mechanism for vibrating the rock-shafts, substantially as described.

21. In a machine of the class described, the combination of a main frame, roll mechanism for applying carbon to the surface of a strip of paper, means for raising and lowering such roll mechanism, a supplementary frame consisting of two parts, one part slidingly mounted upon the main frame of the machine on each side and at the upper part thereof, two rolls rotatably and reciprocatingly mounted on the supplementary frame for rubbing and distributing the applied carbon evenly over the surface of the paper, two rolls for cleaning the surface of the carbon and rotatably mounted on the supplementary frame, two rolls provided with radially-extending wings and rotatably mounted on the supplementary frame for polishing and finishing the surface of the applied carbon, and means for raising and lowering the supplementary frame with its attached roll mechanism into and out of contact with the surface of a sheet of paper, substantially as described.

22. In a machine of the class described, the combination of a main frame, roll mechanism for applying carbon to the surface of a strip of paper, means for raising and lowering such roll mechanism, a supplementary frame consisting of two parts, one slidingly mounted upon the main frame of the machine on each side and at the upper part thereof, two rolls rotatably and reciprocatingly mounted on the supplementary frame for rubbing and distributing the applied carbon evenly over the surface of the paper, two rolls for cleaning the surface of the applied carbon rotatably mounted on the supplementary frame, two rolls provided with radially-extending wings and rotatably mounted on the supplementary frame for polishing and finishing the surface of the applied carbon, means for raising and lowering the supplementary frame with its attached roll mechanism into and out of contact with the surface of a sheet of paper, and means for feeding a strip of paper through the machine, substantially as described.

23. In a machine of the class described, carbon-applying roll mechanism, a main frame, a carbon-box secured thereto adapted to receive a cake of carbon, comprising a flat plate upon which a cake of carbon may be slidingly mounted and a follower-bar in contact with the rear of the cake of carbon, feed-screws engaging each end of the follower-bar, a worm-gear on each feed-screw, a worm-shaft provided with a worm engaging such worm-gear, a rotatable part, intermediate means connecting the worm-shaft with the rotatable part, whereby the cake of carbon is fed inwardly during the operations of the machine to contact the carbon-applying roll mechanism, substantially as described.

24. In a machine of the class described, the combination of a main frame, roll mechanism rotatably mounted in the main frame for applying carbon from a cake of carbon to the surface of a strip of paper, a flanged plate secured to the frame of the machine to support a cake of carbon, a follower-bar, a feed-screw engaging the follower-bar at or near each end thereof, a worm-gear for each feed-screw, a worm-shaft provided with a worm engaging each worm-gear, a bevel-gear on the outer end of the worm-shaft, a shaft rotatably mounted in the frame of the machine, a friction-disk on the outer end of the rotatable shaft, an intermediate shaft rotatably mounted on the frame of the machine provided with a bevel-pinion engaging the bevel-gear on the worm-shaft, a friction-wheel slidingly mounted on the intermediate shaft arranged to have simultaneous rotations therewith and in contact with the surface of the friction-disk, and means for moving the friction-wheel toward or from the center of the friction-disk to vary the rotation of the worm-shaft and thereby the speed at which the follower-bar travels, substantially as described.

25. In a machine of the class described, the combination of a main frame, carbon-applying roll mechanism rotatably mounted thereon for applying carbon from a cake of carbon to the surface of a sheet of paper, a plate secured to the bed of the machine for holding a cake of carbon, a follower-bar slidingly mounted thereon for forcing the cake of carbon toward the carbon-applying mechanism, a feed-screw engaging the follower-bar at or near each end thereof, a worm-gear loosely mounted upon each feed-screw, a disk rigidly secured to each feed-screw adjacent to the surface of the worm-gear, pin mechanism slidingly mounted in the disk to engage each worm-gear so that such worm-gear may rotate the feed-screws or such feed-screws may be rotated independently of the worm-gears, a worm-shaft provided with a worm engaging each worm-gear, and means for rotating the worm-shaft by and during the operations of the machine, substantially as described.

26. In a machine of the class described, the combination of a main frame, carbon-applying roll mechanism rotatably mounted thereon for applying carbon from a cake of carbon to the surface of a strip of paper, a flat plate secured to the bed of the machine for holding a cake of carbon, a follower-bar for forcing a cake of carbon into contact with the carbon-applying roll, feed-screw mechanism for moving the follower-bar backwardly and forwardly, a rotatable shaft in the frame of the machine, a friction-disk mounted thereupon so as to rotate therewith, an intermediate shaft carrying a friction-wheel adjustably mounted thereon in engagement with the friction-disk and engaged with the feed-screw mechanism of the carbon-box to operate the same, and means for moving the friction-disk into and out of contact with the friction-wheel with the cake of carbon whenever desirable or necessary, substantially as described.

27. In a machine of the class described, the combination of a main frame, carbon-applying mechanism arranged to supply carbon from a cake of carbon to the surface of a strip of paper with which said mechanism contacts, slide mechanism slidingly mounted in the frame of the machine in which the carbon-applying roll mechanism is rotatably mounted, a supplementary frame slidingly mounted upon the main frame of the machine, roll mechanism rotatably mounted thereon for distributing, cleaning and finishing the applied carbon and the surface thereof, means for feeding the strip of paper through the machine, a flat plate arranged to hold a cake of carbon and secured to the frame of the machine, a follower-bar arranged to contact the rear part of the cake of carbon, a cover portion, feed-screw mechanism engaging the follower-bar at or near each end thereof, each screw of which is provided with a worm-gear, a worm-shaft provided with a worm engaging each worm-gear, a bevel-gear at or near the end of the worm-shaft, an operating-shaft rotatably mounted in the frame of the machine and carrying a friction-disk at or near the outer end thereof, an intermediate shaft provided with a bevel-pinion engaging the bevel-gear on the worm-shaft and having a friction-wheel slidingly mounted thereon engaging the friction-disk on the operating-shaft, spring mechanism for keeping the operating-shaft and friction-disk in engagement with the friction-wheel, rock-shaft mechanism engaging the slides of the carbon-applying roll mechanism and the supplementary frame, lever mechanism engaging the operating-shaft to move it, and means for operating the rock-shaft and lever mechanism to simultaneously raise and lower the slide and supplementary frame with their carbon-applying and other rolls and move the operating-shaft with its friction-disk into and out of action, substantially as described.

28. In a machine for supplying practically-hard carbon to sheets of paper, the combination of means for initially supplying practically-hard carbon to a sheet of paper, devices for spreading and devices for affixing the carbon on the surface of the paper, and means for varying the position of the supplying means relative to the paper, substantially as described.

29. In a machine for supplying practically-hard carbon to sheets of paper, the combination of means for primarily supplying practically-hard carbon to a sheet of paper, devices for subsequently spreading the carbon evenly over and devices for affixing it to the surface of the paper, means for polishing the exposed surface of the carbon, and means for varying the position of the affixing and polishing means relative to the paper, substantially as described.

30. In a machine for supplying practically-hard carbon to sheets of paper, the combination of means for feeding a sheet or strip of paper through the machine, means for primarily supplying carbon to the sheet of paper, devices for spreading the carbon evenly over and for affixing it to the surface of the paper, means for polishing the exposed surface of the carbon, and means for varying the position of the affixing and polishing means relative to the paper, substantially as described.

31. In a machine for supplying practically-hard carbon to sheets of paper, the combination of means for feeding paper through the machine, means for supplying the paper with practically-hard carbon, devices for spreading the carbon evenly over and for affixing it to the surface of the paper, means for polishing the exposed surface of the carbon, means for cutting the paper into sheets of desired size, and means for varying the position of the affixing and polishing means relative to the paper, substantially as described.

32. In a machine for supplying practically-hard carbon to sheets of paper, the combination of a pocket for holding a cake of carbon in position to be fed to the paper, reciprocating rubbing mechanism for spreading the carbon evenly over and affixing it to the surface of the paper, means for polishing the exposed surface of the carbon, and means for varying the position of the affixing and polishing means relative to the paper, substantially as described.

33. In a machine for supplying practically-hard carbon to sheets of paper, the combination of means for supplying the paper with carbon, reciprocating rubbing mechanism for distributing the carbon evenly over and affixing it to the surface of the paper, rotating mechanism for polishing the exposed surface of the carbon, and means for varying the position of the affixing and polishing means relative to the paper, substantially as described.

34. In a machine for supplying practically-hard carbon to sheets of paper, the combination of means for primarily supplying practically-hard carbon to a sheet of paper, devices for subsequently spreading the carbon evenly over and for affixing it to the surface of the paper, means for polishing the exposed surface of the carbon, and means for varying the position of the supplying means relative to the paper, substantially as described.

35. In a machine for supplying practically-hard carbon to sheets of paper, the combination of means for feeding a sheet or strip of paper through the machine, means for primarily supplying carbon to the sheet of paper, devices for spreading the carbon evenly over and for affixing it to the surface of the paper, means for polishing the exposed surface of the carbon, and means for varying the position of the supplying means relative to the paper, substantially as described.

36. In a machine for supplying practically-hard carbon to sheets of paper, the combination of means for feeding paper through the machine, means for supplying the paper with practically-hard carbon, devices for spreading the carbon evenly over and for affixing it to the surface of the paper, means for polishing the exposed surface of the carbon, means for cutting the paper into sheets of desired size, and means for varying the position of the supplying means relative to the paper, substantially as described.

37. In a machine for supplying practically-hard carbon to sheets of paper, the combination of a pocket for holding a cake of carbon in position to be fed to the paper, reciprocating rubbing mechanism for spreading the carbon evenly over and affixing it to the surface of the paper, means for polishing the exposed surface of the carbon, and means for varying the position of the supplying means relative to the paper, substantially as described.

38. In a machine for supplying practically-hard carbon to sheets of paper, the combination of means for supplying the paper with carbon, reciprocating rubbing mechanism for distributing the carbon evenly over and affixing it to the surface of the paper, rotating mechanism for polishing the exposed surface of the carbon, and means for varying the position of the supplying means relative to the paper, substantially as described.

39. In a machine for supplying practically-hard carbon to sheets of paper, the combination of means for initially supplying practically-hard carbon to a sheet of paper, devices for spreading and for affixing the carbon on the surface of the paper, and means for varying the position of the affixing and spreading means relative to the paper, substantially as described.

40. In a machine for supplying practically-hard carbon to sheets of paper, the combination of means for initially supplying practically-hard carbon to a sheet of paper, devices for spreading and for affixing the carbon on the surface of the paper, means for varying the position of the supplying means relative to the paper, and means for varying the position of the affixing and spreading means relative to the paper, substantially as described.

41. In a machine for supplying practically-hard carbon to sheets of paper, the combination of means for primarily supplying practically-hard carbon to a sheet of paper, devices for subsequently spreading the carbon evenly over and for affixing it to the surface of the paper, means for polishing the exposed surface of the carbon, means for varying the position of the supplying means relative to the paper, and means for varying the position of the affixing and polishing means relative to the paper, substantially as described.

42. In a machine for supplying practically-hard carbon to sheets of paper, the combination of means for feeding a sheet or strip of paper through the machine, means for primarily supplying carbon to the sheet of paper, devices for spreading the carbon evenly over and for affixing it to the surface of the paper, means for polishing the exposed surface of the carbon, means for varying the position of the supplying means relative to the paper, and means for varying the position of the affixing and polishing means relative to the paper, substantially as described.

43. In a machine for supplying practically-hard carbon to sheets of paper, the combination of means for feeding paper through the machine, means for supplying the paper with practically-hard carbon, devices for spreading the carbon evenly over and for affixing it to the surface of the paper, means for polishing the exposed surface of the carbon, means for cutting the paper into sheets of desired size, means for varying the position of the supplying means relative to the paper, and means for varying the position of the affixing and polishing means relative to the paper, substantially as described.

44. In a machine for supplying practically-hard carbon to sheets of paper, the combination of a pocket for holding a cake of carbon in position to be fed to the paper, reciprocating rubbing mechanism for spreading the carbon evenly over and affixing it to the surface of the paper, means for polishing the exposed surface of the carbon, means for varying the position of the supplying means relative to the paper, and means for varying the position of the affixing and polishing means relative to the paper, substantially as described.

45. In a machine for supplying practically-hard carbon to sheets of paper, the combination of means for supplying the paper with carbon, reciprocating rubbing mechanism for distributing the carbon evenly over and affixing it to the surface of the paper, rotating mechanism for polishing the exposed surface of the carbon, means for varying the position of the supplying means relative to the paper, and means for varying the position of the affixing and polishing means relative to the paper, substantially as described.

46. In a machine for supplying practically-hard carbon to the surface of paper, the combination of means for initially supplying the carbon to the surface of the paper and means for finishing the surface after the carbon has been applied, of a holder for the carbon and mechanism for feeding the carbon to the supplying means, substantially as described.

47. In a machine for supplying practically-hard carbon to the surface of paper, the combination of means for supplying the carbon to the surface of the paper and means for finishing the surface after the carbon has been applied, of a holder for the carbon and mechanism acting automatically to feed the carbon to the supplying means, substantially as described.

48. In a machine for supplying practically-hard carbon to the surface of paper, the combination of means for supplying the carbon to the surface of the paper and means for finishing the surface after the carbon has been applied, of a holder for the carbon, mechanism for feeding the carbon to the supplying means, and independent means for feeding the carbon, substantially as described.

FRANK W. WEEKS.

Witnesses:
 FLORENCE N. LERENSALEE,
 ANNIE C. COURTENAY.